June 2, 1964 W. V. CROMOGA 3,135,065
TROLLING PLANE

Filed Jan. 22, 1962 3 Sheets-Sheet 1

INVENTOR.

BY WALTER V. CROMOGA

ATTORNEY

INVENTOR.
BY WALTER V. CROMOGA
ATTORNEY

June 2, 1964  W. V. CROMOGA  3,135,065
TROLLING PLANE
Filed Jan. 22, 1962  3 Sheets-Sheet 3

INVENTOR.
BY WALTER V. CROMOGA
ATTORNEY

United States Patent Office 3,135,065
Patented June 2, 1964

3,135,065
TROLLING PLANE
Walter V. Cromoga, 3540 Portland Ave., Tacoma, Wash.
Filed Jan. 22, 1962, Ser. No. 167,866
4 Claims. (Cl. 43—43.13)

This invention relates to new and useful improvements in fishing tackle and more particularly is concerned with a trolling plane or sinker.

It is a primary object of the present invention to provide a trolling plane which although light in weight embodies a shape and structure which causes it to submerge when leading a baited hook in a trolling operation.

Further objects are to provide a trolling plane which is substantially snag-proof; which may be used as a combination sinker and flasher or if desired as a lure; which is adapted to be rendered inoperative as a sinker when a fish is on the line whereby to offer substantially no resistance to the landing of the fish; which automatically rises to the surface should the fish hook become unbaited; and which due to its light weight is readily handled and carried in the tackle box. Briefly stated, the present trolling plane comprises a sheet-like body portion which in its longitudinal dimension is tapered from front to rear and in its lateral dimension has a concavo-convex configuration. Secured to the upper surface of the body portion is a bail or yoke which is positioned selectively on the body and also of selected shape whereby to cause the plane to perform various functions of diving, trolling, freeing itself from snags, and rising to the surface.

The invention will be better understood and additional objects thereof will become more apparent from the accompanying specification and claims considered together with the accompanying drawings, wherein like numerals of reference indicate like parts and wherein:

With particular reference to the drawings and first to FIGURES 1-4 the present trolling plane comprises a sheet-like body portion 10 having a rounded, widened front or leading end 12 and converging or inwardly tapered lateral side edges 14 terminating in a tail or trailing portion. Through the medium of this structure the greatest mass of the body is adjacent the front.

The body portion 10 may be constructed from sheet material or molded from plastic, and since, as will be apparent hereinafter, its submerging function is achieved by design and positioning of the parts rather than by its weight, it can be made of light weight material such as glass fiber.

Figure 2:
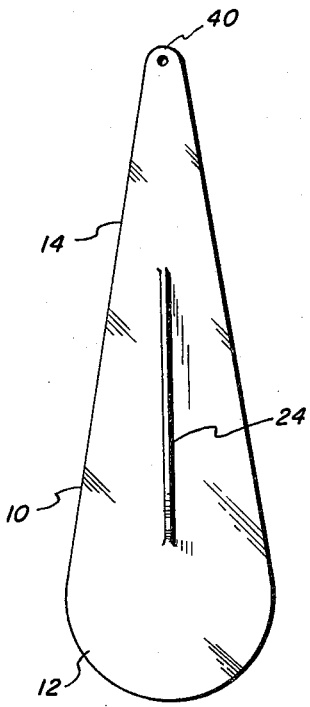
FIGURES 2, 3 and 4 are top plane, side elevational, and front end elevational views, respectively, of the present plane.
Figure 3:
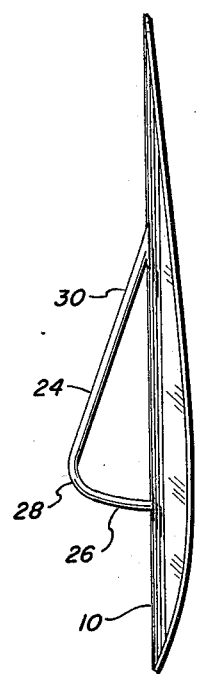
Figure 4:
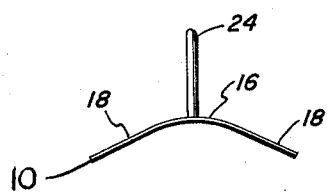

In cross section the body 10 assumes a concavo-convex configuration. More specifically, as seen in FIGURE 4, the longitudinal central portion thereof is generally curved at 16 and this curved portion leads laterally into substantially straight side portions 18 forming generally a U-shape in cross section, although the sides 18 may connect centrally of the body portion at an angle to form a V-shape. At any rate, for the purpose of providing a rigid structure and for providing stabilization of the plane in the water, the sides 18 are inclined from the upper plane of the body at angles of from 5 to 20°, and preferably at 10°.

Forming an integral part of the body 10 is a bail or yoke 24 which, importantly, has a front fish-landing segment 26 projecting outwardly from the body 10 at substantially right angles thereto and leading into an arcuate trolling segment 28. Trolling segment 28 in turn leads into a rearwardly inclined, reversing segment 30. In a preferred arrangement, the bail 24 is of less length than the body 10 and is attached at approximately equal distances from the ends. Thus, the trolling segment 28 is disposed forwardly of the center of the body and the rear juncture of the bail with the body is disposed rearwardly of the center.

A fish line 32 is connected to the bail 24 by means of a ring 34 slidably mounted on the bail for adjustable positioning thereon, and a bait line 36 is attached to the tail portion of the body 10 by means of a ring 38 engageable in an aperture 40 of the body. Suitable swivel means 42 are included in the fish line.

With particular reference to FIGURES 5-8, the operation of the present device in a trolling function is as follows:

With the fish or pole line 32 slidably attached to the bail 24 by means of ring 34, and the bait line 36 attached to the tail portion of the plane and suitably baited, the device is placed on the surface of the water and fishing line payed thereto. Since the forward portion of the plane contains the greatest mass it will nose down in the water.

Figure 1:
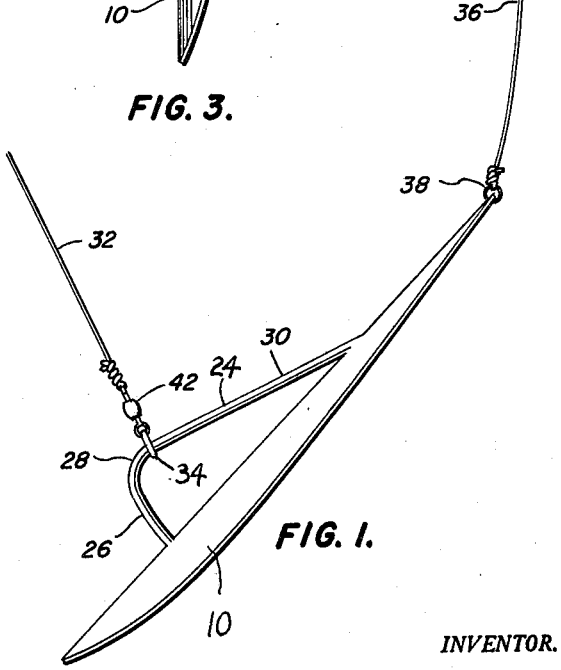
FIGURE 1 is a side elevational view of the plane embodying the features of the present invention.
Figure 5:
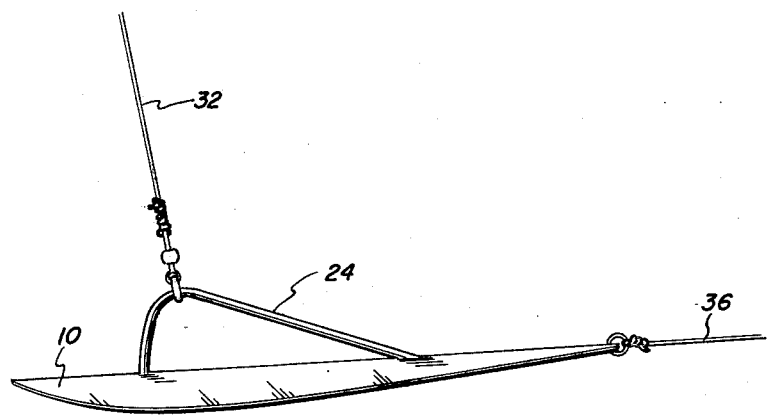
FIGURES 5-8 are side elevational views of the present device showing various functions of operation thereof.

As the fish line tightens thereon in the trolling function, the ring 34 slides into the trolling segment 28 of the bail 24. Since the trolling segment is located forwardly on the body 10 the plane dives downwardly. This action is assisted by the greater mass of the body at its front. This diving function only occurs, however, when the fish hook on line 36 is baited because the bait, being buoyant or almost buoyant, produces a drag on the plane and prevents the latter from nosing straight down which, as will be more apparent hereinafter, would cause the ring 34 to slide to the reversing segment 30 of the bail 24 and cause the plane to rise in the water. The dive position of the present device is shown in FIGURE 1.

The plane will continue to dive until it is in a position relative to the pole such that the ring 34 slides rearwardly slightly on the bail, but still in the trolling segment, and allows the plane to level off. This is the normal trolling position of the plane wherein it moves through the water in substantially a horizontal direction, FIGURE 5.

Figure 8:
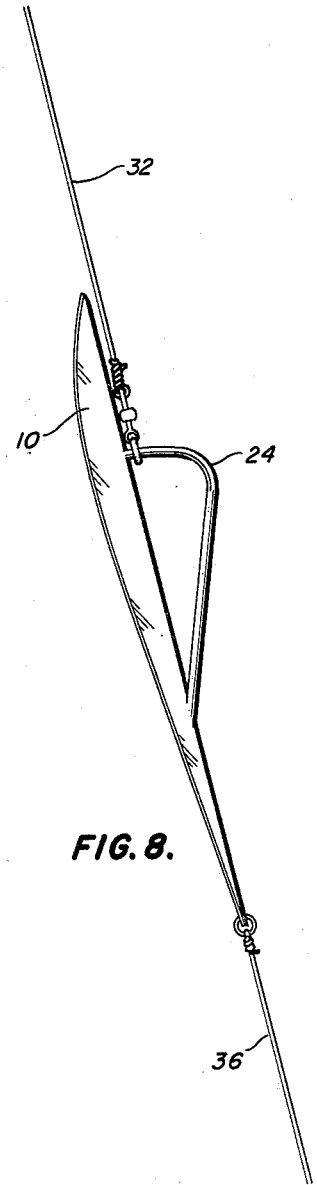

When a fish is hooked, FIGURE 8, the lines 32 and 36 are stretched taut in substantial linear relationship. This causes the ring 34 to slide forwardly on the bail to the point of juncture of bail portion 26 with the body 10. Thus, the sinker is in linear relationship with the lines and offers little or no resistance to the landing of the fish.

Figure 6:
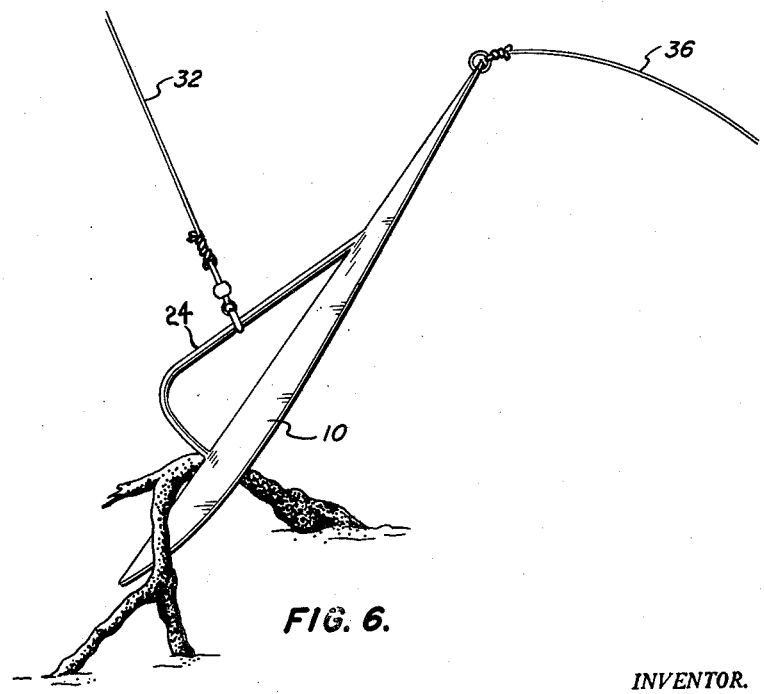
Figure 7:
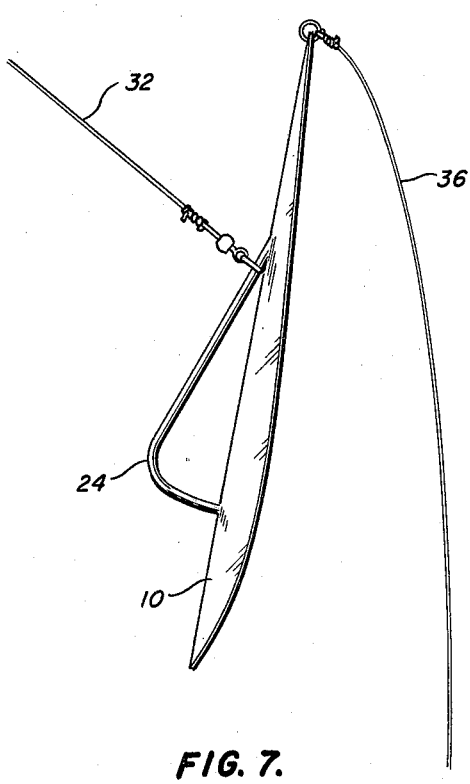

The present plane is substantially snag-proof. With reference to FIGURE 6, it will be seen that when the leading end thereof engages a snag, such as a submerged log, the tail end will flip up and consequently the plane rides up over the snag. As soon as the device clears the snag it will resume its FIGURE 5 trolling position.

As stated hereinbefore, the bait produces sufficient drag on the plane to hold it in its diving or trolling operations. If the bait should come off the hook, however, the drag on the plane disappears and the nose of the latter will dive straight down with the result that the ring 34 slides into the reversing segment and against the rear juncture of the bail with the body 10. Thus, the body 10 assumes substantially a vertical position and an upward pulling action is thus applied to the rearward end of the body, FIGURE 7. The plane immediately rises to the surface of the water and furthermore will jump completely out of the water to put the fisherman on notice that his hook is not baited.

The present plane performs the functions of a lead weight but does not include the disadvantages of that type of sinker. That is, it offers substantially no resistance to the landing of the fish and its use can only be equalled in operation by lead weights in combination with release mechanisms for discarding the lead when a fish is hooked. Replacement of a lead weight after each strike, however, is extremely expensive.

Furthermore, the present device is light in weight for convenience in handling and is inexpensive to manufacture. In addition, it is substantially snag-proof. If desired, it may be used as a flasher or lure, it being required only that it be employed with a bait or other means which produce a drag thereon. Also, since the device will rise to the surface of the water when the hook becomes unbaited the fisherman is advised immediately that his bait is gone.

It is to be understood that the form of my invention herein shown and described is to be taken as a preferred example of the same and that various changes in the shape, size and arrangement of parts may be resorted to without departing from the spirit of my invention and the scope of the subjoined claims.

Having thus described my invention, I claim:

1. A trolling line plane adapted for use with a bait line and comprising a sheet-like body having forward and rearward ends, the body having a greater portion of its weight at its forward end, means on the rearward end of the body for attaching a bait line, and a rigid contoured bail positioned wholly inwardly of the ends of the body and having forward and rearward ends secured to and projecting upwardly from the upper surface of the body inwardly of the ends of the body and on the longitudinal centerline thereof, the bail forming a triangle with a portion of said body and having an angular portion intermediate the ends of the bail and disposed forwardly of the center of the body and adapted slidably to receive fish line attaching means whereby the attaching means is slidable between the angular portion and the respective secured ends of the bail.

2. The trolling line plane of claim 1 wherein the bail includes a forward portion extending upwardly from the body at substantially a right angle and into the angular portion to permit the fish line attaching means to slide from the angular portion to a point adjacent the body and wherein the rearward end of the bail leads upward from its rearward end into the angular portion to permit the fish line attaching means to slide rearwardly to a point adjacent the body to incline the rearward end of the body forwardly for ascent.

3. The trolling line plane of claim 1 wherein the body has downwardly inclined side portions.

4. The trolling line plane of claim 1 wherein the lateral side edges of the body are tapered inwardly from front to rear.

References Cited in the file of this patent

UNITED STATES PATENTS

| | | |
|---|---|---|
| 2,220,302 | Thorne | Nov. 5, 1940 |
| 2,235,868 | Coolidge et al. | Mar. 25, 1941 |
| 2,520,562 | Peeler | Aug. 29, 1950 |